No. 841,043. PATENTED JAN. 8, 1907.
M. W. PALMER.
LIQUID FREEZER.
APPLICATION FILED JAN. 20, 1906.

2 SHEETS—SHEET 1.

Witnesses
Chas. L. Wolf
A. B. Blackwood

Inventor
Melvin W. Palmer.
By his Attorney
Charles A. Stephens

No. 841,043. PATENTED JAN. 8, 1907.
M. W. PALMER.
LIQUID FREEZER.
APPLICATION FILED JAN. 20, 1906.
2 SHEETS—SHEET 2.
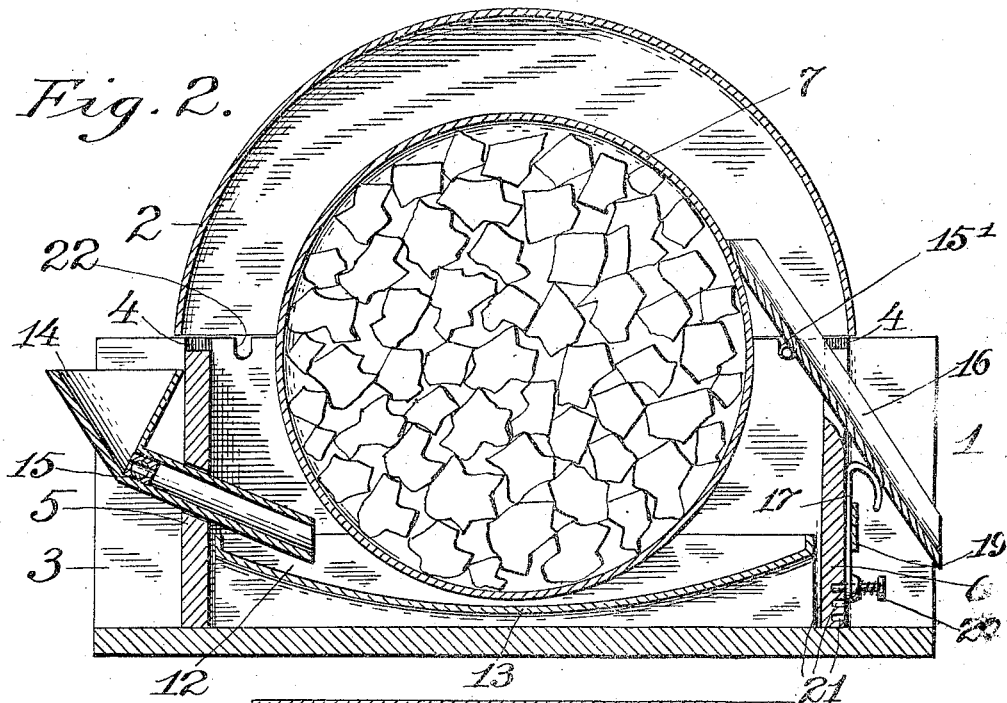
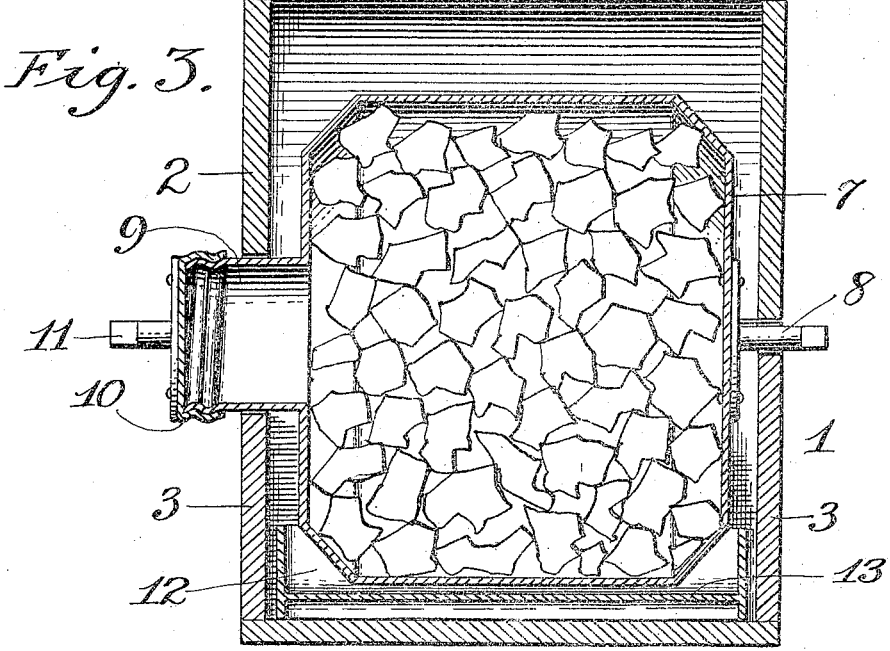
Witnesses
Chas. L. Wolf
A. B. Blackwood.
Inventor
Melvin W. Palmer.
By his Attorney
Charles A. Stephens

UNITED STATES PATENT OFFICE.

MELVIN W. PALMER, OF CATSKILL, NEW YORK.

LIQUID-FREEZER.

No. 841,043.      Specification of Letters Patent.      Patented Jan. 8, 1907.

Application filed January 20, 1906. Serial No. 296,934.

*To all whom it may concern:*

Be it known that I, MELVIN W. PALMER, a citizen of the United States, and a resident of Catskill, in the county of Greene and State of New York, have invented certain new and useful Improvements in Liquid-Freezers, of which the following is a specification.

My invention relates to liquid-freezers, and particularly to ice-cream freezers.

It has for its object to provide an ice-cream freezer of the character embodying a rotatable cylinder adapted to contain a freezing mixture and be operated from either side through a receptacle containing cream to take up and freeze layers of the cream upon its outer circumference and deliver it from either end, thereby conveniently adapting the freezer to be operated from and to deliver ice-cream from either side of a counter or table on which it may be fastened or placed.

It has for a further object to provide a device of the character set forth embodying advantages in point of perfect operation, simplicity, inexpensiveness, and durability.

Figure 1:
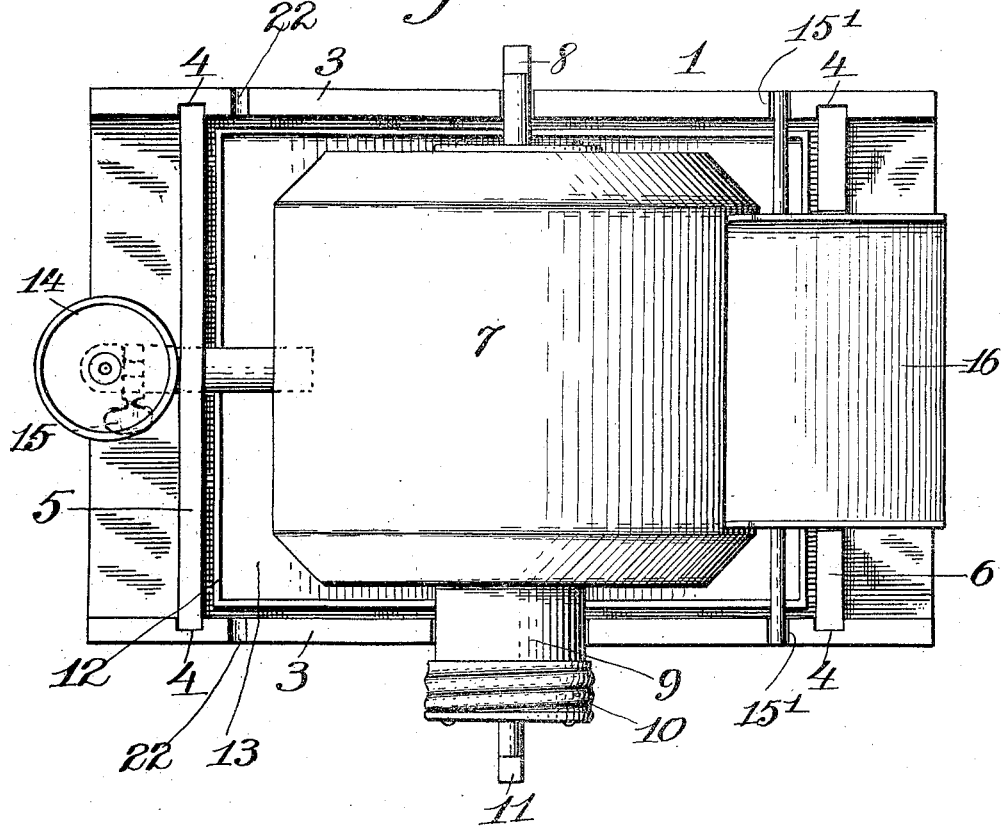
Figure 4:
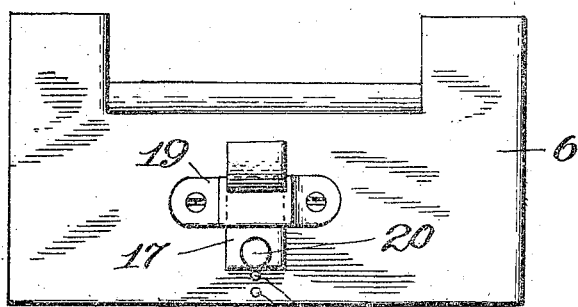

In the drawings, Figure 1 is a plan view of my freezer with the cover removed; Fig. 2, a longitudinal vertical sectional view; Fig. 3, a transverse vertical sectional view, and Fig. 4 a detail view of one of the end pieces having the adjustable plate for resiliently supporting the scraper-chute.

In all the figures of the drawings like reference characters designate corresponding parts.

Referring to the drawings, 1 designates the casing, and 2 the cover therefor, the sides 3 of the casing having vertically-extending grooves 4, adapted to receive and removably retain the interchangeable end pieces 5 and 6 in place.

The cylinder 7 is rotatably mounted in the casing upon a journal 8, secured to one side thereof and having a squared end adapting it to receive a crank for turning the cylinder from one side and a neck 9, projecting from the other side thereof and serving as an opening for the introduction of the freezing mixture, which may consist, as usual, of cracked ice and salt, said neck having its outer end spirally threaded to adapt it to receive a spirally-threaded removable closing-cap 10, to which a bar 11, similar to that forming the journal 8, is secured to adapt it to receive a crank for turning the cylinder from the other side.

A pan 12, adapted to receive the cream to be frozen, is placed in the casing beneath the cylinder, said pan having straight sides to give it a firm seat upon the bottom of the casing, and thus prevent rocking, and a rounded bottom 13, somewhat conforming to the circumference of the cylinder, so that the cream will run directly under the center of the cylinder in a position to be readily taken up thereby.

The neck of a funnel 14 extends through the end piece 5 to a position over the pan to afford means for the convenient introduction of cream into said pan and is provided with a stop-cock 15 to control the feeding of the cream.

A removable scraper-chute 16 is removably journaled in bearings 15' in the sides of the casing over the end piece 6, so that its upper end will come near the circumference of the cylinder to thereby remove the cream frozen thereon and deliver it into a receptacle. Means is provided for adjusting said scraper so that the upper end can be brought into the proper relation to the circumference of the cylinder and resiliently held, so that it will adjust itself to any unevenness of the surface of said cylinder, said means comprising a plate 17, slidably retained on its end piece 6 by a keeper 19, the upper end having a rounded spring projection adapted to bear against the under surface of the scraper-chute and the lower end provided with a spring-pressed pin 20, adapted to engage the holes 21 in the end piece one at a time and hold the plate in its adjusted position. Bearings 22 are also provided in the opposite ends of the sides of the casing to that of the bearings 15', said bearings being for the purpose of receiving the journals of the removable scraper-chute when the operation of the freezer is reversed.

It will be understood that to reverse the operation of the freezer the crank is removed from the journal 8 and placed on the bar 11, the scraper-chute 16 and end pieces removed, the end pieces exchanged in position, and the journals of the scraper-chute then mounted in the bearings 22, so that the upper end of the scraper will bear against or come close to circumference of the cylinder from the opposite end of the casing, and finally, if necessary, the plate 17 is adjusted to resiliently hold the upper end of the scraper-chute in its proper relation to said cylinder.

I do not wish to be understood as limiting myself to the precise details and arrangement of parts shown and described, but reserve the right to all modifications within the scope of my invention.

Having now described my invention, what I claim as new, and desire to secure by Letters Patent, is—

1. In a liquid-freezer, a casing, a pan located therein, a cylinder rotatably journaled therein, a removable adjustable scraper-chute adapted to be mounted at either end of said casing in line with the cylinder, removable interchangeable end pieces, an adjustable plate mounted on one of said end pieces and having a projection adapted to bear against and support the lower end of the scraper-chute and a funnel mounted in the other one of said end pieces and projecting into said casing over said pan, substantially as described.

2. In a liquid-freezer, a casing, a pan located therein, a cylinder rotatably journaled therein and having means adapting it to be turned from either side, a removable adjustable scraper-chute adapted to be mounted at either end of said casing in line with the cylinder, removable interchangeable end pieces, an adjustable plate mounted on one of said end pieces and having a projection adapted to bear against and support the lower end of said scraper-chute and a funnel mounted in the other one of said end pieces and projecting into said casing over said pan, substantially as described.

3. In a liquid-freezer, a casing, a pan located therein, a cylinder rotatably journaled therein, a removable adjustable scraper-chute adapted to be mounted at either end of said casing in line with the cylinder, removable interchangeable end pieces, an adjustable plate mounted on one of said end pieces and having a spring projection adapted to bear against and yieldably support the lower end of the scraper-chute and a spring-pressed pin adapted to engage said end piece and lock said plate in its adjusted position and a funnel mounted in the other one of said end pieces and projecting into said casing over said pan, substantially as described.

Signed at New York, in the county of New York and State of New York, this 15th day of January, A. D. 1906.

MELVIN W. PALMER.

Witnesses:
C. L. WOLF,
A. B. BLACKWOOD.